United States Patent [19]

Cain et al.

[11] 4,033,641

[45] July 5, 1977

[54] FLANGE MOUNT

[75] Inventors: Earl S. Cain, Portola Valley; Jerome A. Carlson, Woodside; George E. Goodrich, San Carlos, all of Calif.

[73] Assignee: Tribotech, Redwood City, Calif.

[22] Filed: Mar. 5, 1976

[21] Appl. No.: 664,164

[52] U.S. Cl. .................................. 308/15; 308/72
[51] Int. Cl.² .................. F16C 13/00; F16C 35/00; F16C 39/00
[58] Field of Search ............ 308/15, 72, 73, 189 A, 308/194, 189, 237

[56] References Cited

UNITED STATES PATENTS

| 2,794,691 | 6/1957 | Noe | 308/72 |
| 3,871,723 | 3/1975 | Pray | 308/15 |
| 3,941,436 | 3/1976 | Kazama | 308/72 |

Primary Examiner—Joseph F. Peters, Jr.
Assistant Examiner—Richard A. Bertsch

[57] ABSTRACT

A one-piece formed metal flange mount for bearings.

8 Claims, 15 Drawing Figures

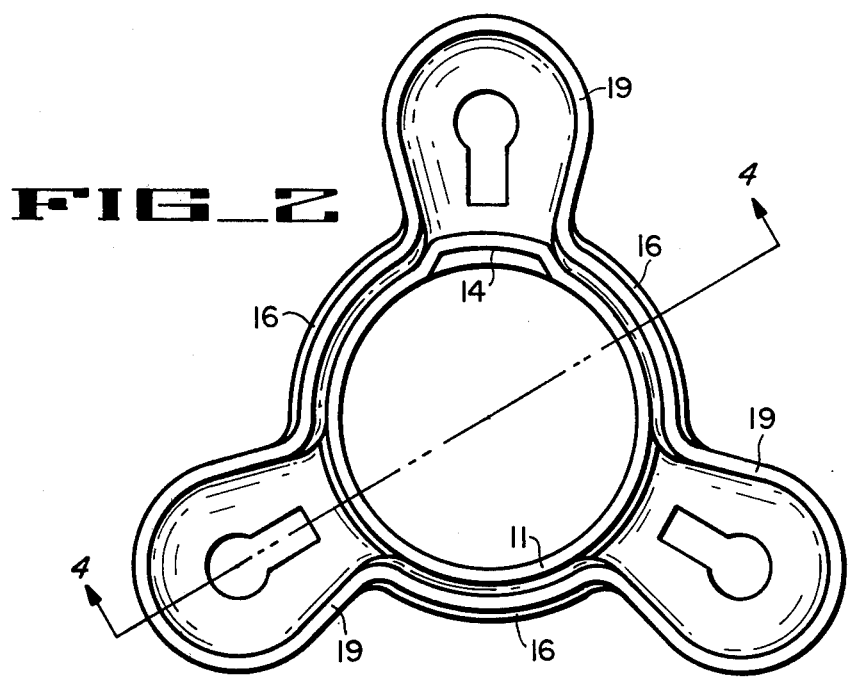
FIG_2
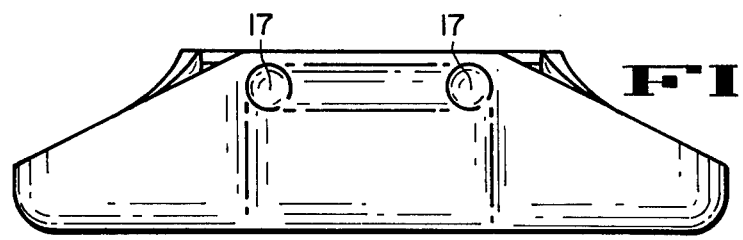
FIG_3
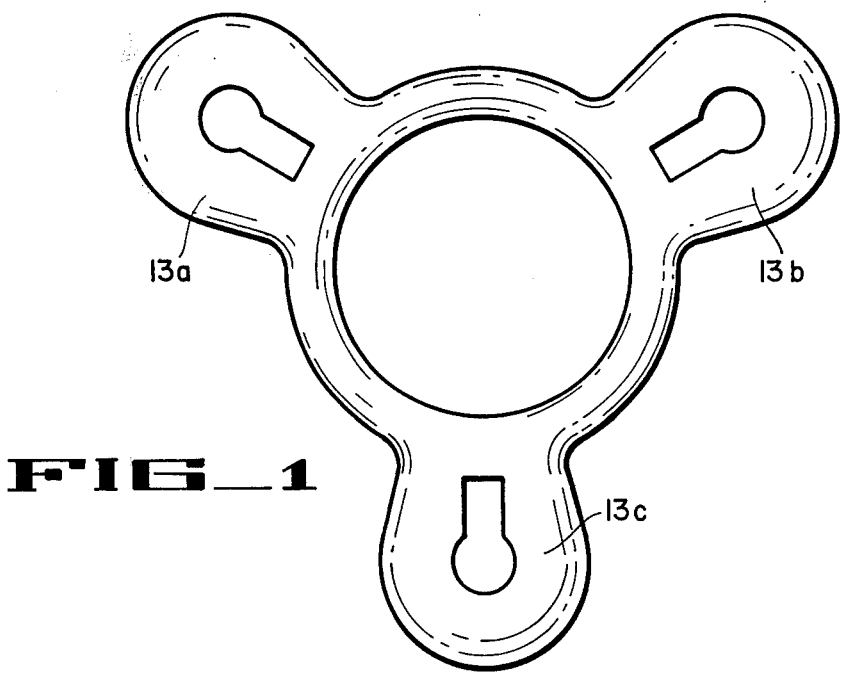
FIG_1

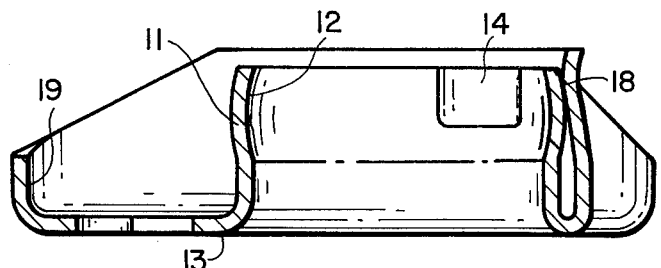
FIG_4
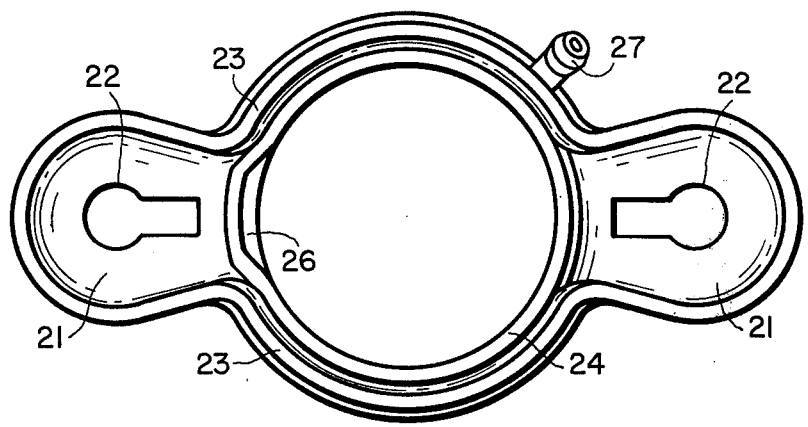
FIG_5
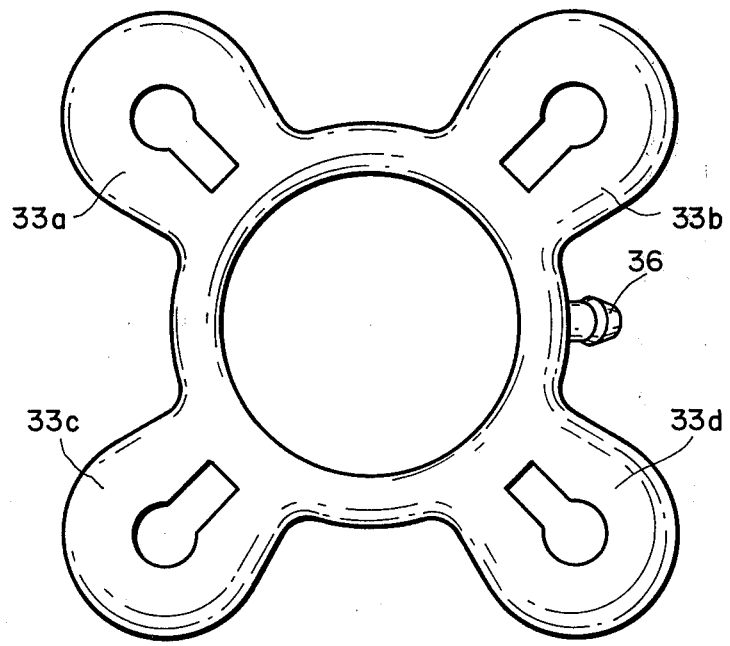
FIG_6

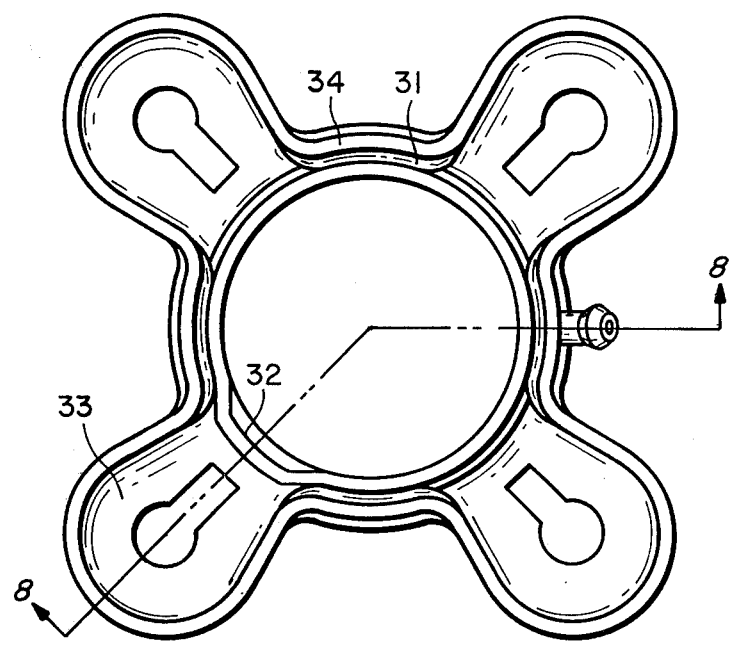
FIG_7
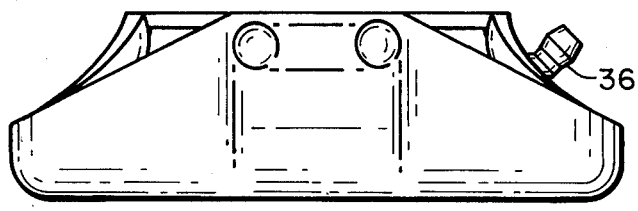
FIG_9
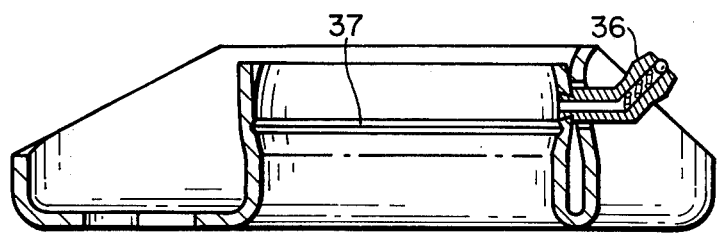
FIG_8

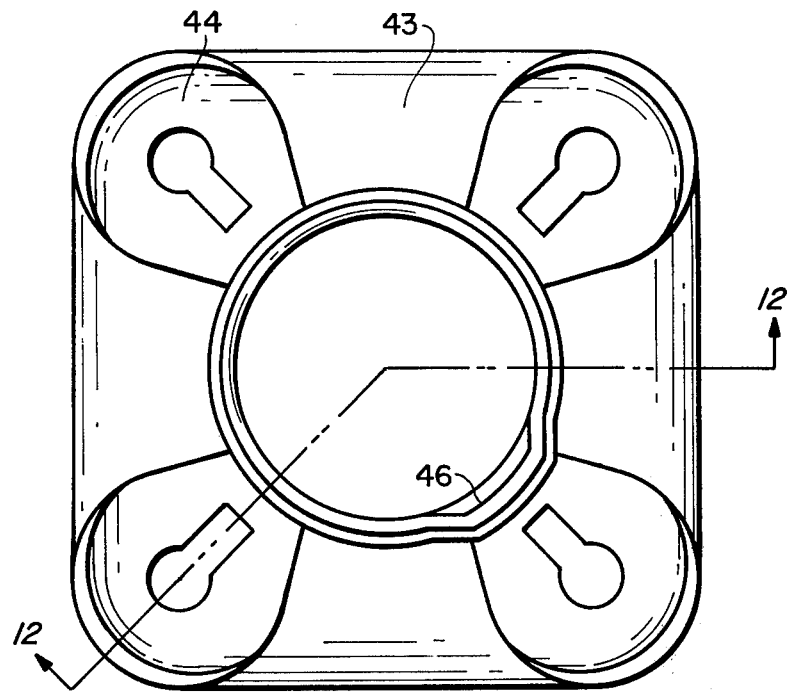
FIG_10
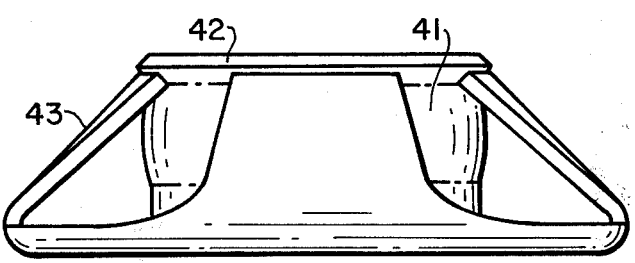
FIG_11
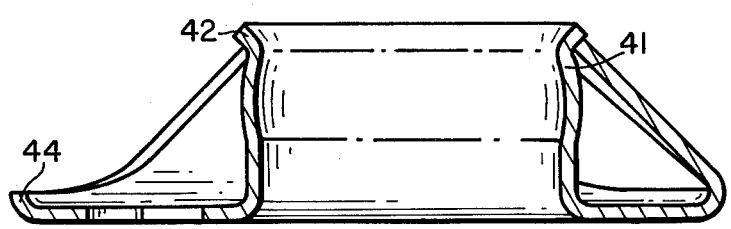
FIG_12

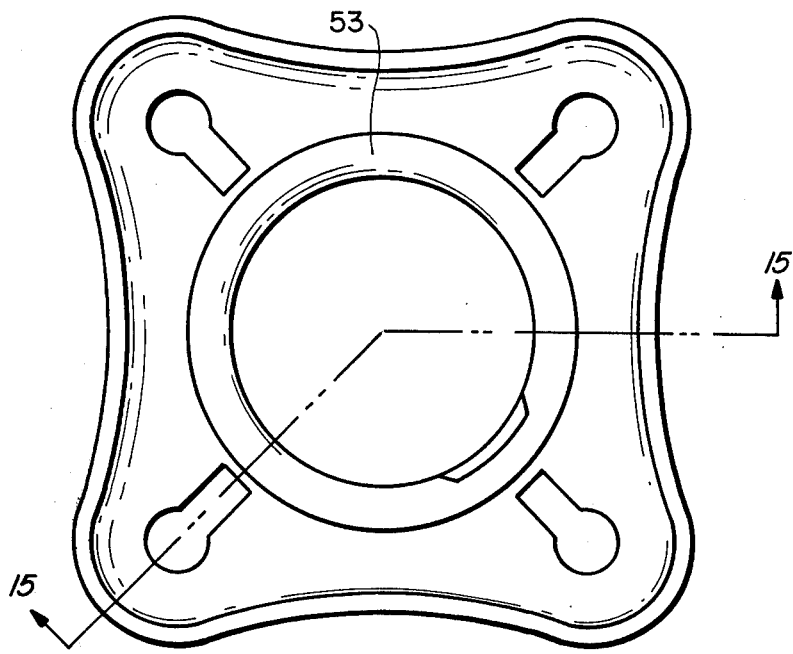
FIG_13
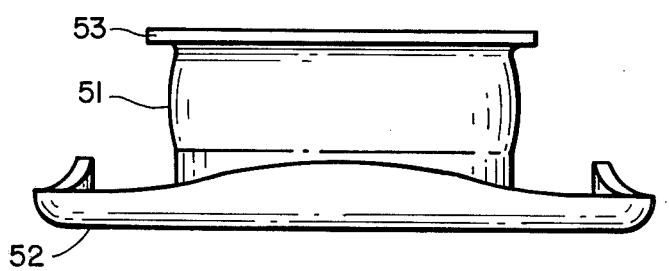
FIG_14
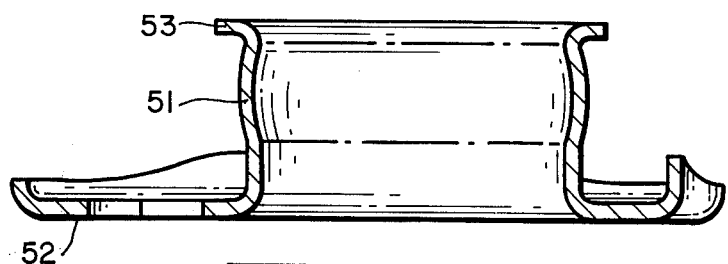
FIG_15

FLANGE MOUNT

REFERENCE TO RELATED APPLICATION

In our copending application entitled "Bearing Mount", Ser. No. 492,214, filed July 26, 1974, now U.S. Pat. No. 3,966,275 there is described and claimed a one-piece metal bearing mount which can serve as a flange, pillow block or take-up mount for self-aligning bearings.

BACKGROUND OF THE INVENTION

This invention relates generally to flange mounts and, more particularly, to one-piece strong formed metal flange mounts.

Present designs of flange mounts are generally of two types: one-piece machined cast flanges and two-piece pressed steel flanges. There has also been described in the prior art one-piece pressed steel flange mounts such as shown in U.S. Pat. No. 2,794,691. Flange mounts include 2, 3, 4, or more holes for mounting.

The cast and machine type are relatively expensive to process and machine to meet the typical heavy duty service for which they are intended. The surface to which they are attached must be relatively flat for if it is uneven, the units often fracture when they are secured to the equipment.

The pressed flange units are relatively economical. However, they are only intended for light duty applications. They generally cannot support or accommodate heavy or large radial thrust and moment loads. Generally, the flanges include central portions which project past the mounting face requiring the user to provide a much larger opening for accommodating the projection. They are generally composed of two or more mating pieces with attendant adaptation and assembly expenses. Those including lubrication means require special means for preventing escape of the lubricant.

OBJECTS AND SUMMARY OF THE INVENTION

It is a general object of the present invention to provide a strong economical one-piece flange unit.

It is another object of the present invention to provide a flange having a bearing mount which is supported for radial and thrust loads and twisting moments.

It is another object of the present invention to provide a flange mount which can be welded to a supporting structure.

The foregoing and other objects of the invention are achieved by a flange mount including a flange plate having a bearing receiving flange extending outwardly at one face thereof and adapted to receive and hold a bearing therein, the other face of said flange plate defining mounting surfaces substantially perpendicular to the axis of said flange for mounting said flange mount on a supporting surface, and means providing rigidity to said mounting surfaces and said bearing receiving flange.

BRIEF DESCRIPTION OF THE DRAWINGS

FIG. 1 is a front plan view of a three-hole flange mount in accordance with the invention.

FIG. 2 is a rear plan view of the bearing mount.

FIG. 3 is a bottom-elevational view of the bearing mount.

FIG. 4 is a sectional view taken along the lines 4—4 of FIG. 2.

FIG. 5 is a rear elevational view of a two-hole flange mount.

FIG. 6 is a front elevational view of a four-hole flange mount.

FIG. 7 is a rear elevational view of the four-hole flange mount.

FIG. 8 is a sectional view taken generally along the lines 8—8 of FIG. 7.

FIG. 9 is a bottom elevational view of the four-hole flange mount.

FIG. 10 is a rear elevational view of a flange mount in accordance with another embodiment of the invention.

FIG. 11 is a bottom elevational view of the mount in FIG. 10.

FIG. 12 is a sectional view taken generally along the lines 12—12 of FIG. 10.

FIG. 13 is a rear elevational view of a flange mount in accordance with another embodiment of the invention.

FIG. 14 is a bottom elevational view of the flange mount shown in FIG. 13.

FIG. 15 is a sectional view taken along the lines 15—15 of FIG. 13.

DESCRIPTION OF PREFERRED EMBODIMENT

Referring to the figures which show flange mounts in accordance with the invention, it is seen they are formed of a single sheet metal piece as, for example, by multi-stage forming in a press with appropriate dies. It will also be apparent that the mount can be formed by forging, bending and welding and by other methods of forming. The preferable mount is the type shown and formed as a unitary structure from a single sheet or plate of material by stamping or pressing.

Referring now to FIGS. 1 - 4, there is shown a three-hole mounting flange. The flange includes a bearing mounting flange 11 whose inner surface 12 is substantially a surface of revolution to accommodate and hold an associated bearing. The flange 11 is formed by pressing the center of a sheet of metal to extend outwardly from face 13. The inner surface of revolution 12 of the bearing flange 11 may include a spherical surface adapted to receive and hold a bearing having a spherical outer surface to provide a self-aligning bearing. The bearing is mounted in the spherical surface by inserting the bearing into the bearing receiving flange through a mounting slot 14. The bearing is then rotated so that its axis is perpendicular to the face 13. As is well known, the spherical bearing seat provides means whereby the bearing can be aligned with an associated shaft even when the axis of the bearing flange 11 is not accurately aligned with respect to the axis of the associated shaft. The bearing mounting flange may be provided with a grease lubrication fitting and a grease groove.

After the flange is formed, the outer portions of the sheet or plate of material are formed or bent in the same direction as the bearing mounting flange substantially as shown in the drawings. When the outer portions are bent, the resulting flange will include the mounting face portion 13 and sides 16 extending between the mounting face portion substantially in the same direction spaced adjacent to and substantially parallel to the bearing receiving flange. The ends of the sides are bent inwardly to engage the bearing flange thereby providing a rigid support for the flange. The sides 16 are bent inwardly by pressing areas such as 17 on the ends of the sides whereby the end portion of the bearing mounting flange is engaged as shown at 18, FIG. 4. The webs or beams formed by the sides 16 effectively gusset or support between the bearing flange and the back side of the flange plate. This supports the bearing receiving flange against radial and thrust loads and twisting moment. The mounting face 13 may be provided with holes 18 to receive means, such as bolts or the like, for securing the flange to associated equipment. The edges 19 of the mounting face are bent in the same direction as the bearing mounting flange and provide rigidity to the mounting feet or surfaces. In view of the fact that it is made out of plate or sheet material rather than bolted or otherwise secured, the flange may be welded to associated equipment. The mounting slot permits insertion of the bearing after welding and easy replacement of worn bearings.

A two-hole flange of similar construction is illustrated in FIG. 5. The flange includes mounting surface 21 with mounting holes 22. The bent reinforcing portions 23 on each side of the mounting surface are bent to engage the bearing mounting flange constructed as previously described. The bearing mounting flange includes a mounting slot 26. Grease fitting 27 extends through an opening (not shown) on the portions 23. The fitting 27 may be swaged in place in the bearing receiving flange. The surface includes a grease groove (not shown) which communicates with the grease fitting.

Referring to FIGS. 6 through 9, there is shown a four-hole flange. As in the previous embodiments, the flange includes a bearing mounting flange 31 with bearing insertion slot 32. The material is bent inwardly between the mounting surfaces 33 to provide beam portions 34 which engage and hold the bearing flange 31. A grease fitting 36 is shown secured in place and communicating with a lubrication or grease groove 37. The portions surrounding the mounting surfaces are bent upwardly in the same direction as the bearing mounting flange to give additional strength to the mounting surfaces. Elongated mounting holes are provided. These holes give tolerance in mounting. The particular configuration can accommodate both round shank or square shank bolts optionally.

In FIGS. 10 and 12 there is shown a mounting flange of rectangular configuration including a bearing mounting flange 41 having a lip 42 which is engaged by the fingers or beams 43 extending upwardly from the edges of the rectangular portion towards and engaging the mounting flange under the lip 42. The portions of the flange adjacent the mounting surfaces 44 are bent to provide rigidity to the mounting surfaces. The flange 44 includes a bearing receiving slot 46.

Referring to FIGS. 13 – 15, there is shown another mounting flange having a substantially rectangular configuration with a bearing mounting flange 51 extending from one face of the mounting surface 52. The flange includes an outwardly extending lip 53 to add rigidity to the top of the mounting flange. The edges of the mounting face are bent upwardly as shown at 54 in the figures. This provides rigidity to the extended mounting portions. The bearing mounting flange, however, depends upon its own rigidity for support.

Thus there is provided a one-piece mounting flange which in its simplest form provides a rigid bearing mounting flange extending from a reinforced mounting face and in its more complex preferred form, includes means for engaging the end and supporting the bearing mounting flange from the flange mounting face.

We claim:

1. A flange mount including a flange plate, a bearing receiving flange extending outwardly from one face thereof and adapted to receive and hold a bearing therein, the other face of said flange plate defining a mounting surface substantially perpendicular to the axis of said bearing receiving flange for mounting the flange on a supporting surface, the edges of said flange plate being bent in the same direction as the bearing receiving flange to stiffen the mounting plate with portions of said bent edges extending to and engaging the end of the bearing receiving flange.

2. A flange mount including a flange plate, a cylindrical bearing receiving flange extending outwardly from one face thereof and adapted to receive and hold a bearing therein, the other face of said flange plate defining a mounting surface substantially perpendicular to the axis of said bearing receiving flange for mounting the flange on a supporting surface, the outer edges of said flange plate bent to extend in the same direction as the bearing receiving flange and including portions extending adjacent portions of the bearing receiving flange, said adjacent portions having their ends bent inwardly to engage and support the end of the bearing receiving flange and other portions providing stiffening to the support surface.

3. A flange mount as in claim 2 wherein said cylindrical bearing receiving flange is spherical to receive a spherical bearing.

4. A flange mount as in claim 3 in which said bearing receiving flange includes a bearing mounting slot.

5. A bearing receiving flange as in claim 2 wherein said portions extending adjacent portions of the bearing receiving flange extend generally parallel thereto.

6. A bearing receiving flange as in claim 2 wherein said portions extending adjacent portions of the bearing receiving flange extend at an angle, the end of the bearing receiving flange includes a lip and the ends engage said lip.

7. A bearing receiving flange as in claim 2 wherein the end of said bearing receiving flange is engaged by said edges at a plurality of equally spaced areas around its periphery.

8. A bearing receiving flange as in claim 2 wherein said mounting surface includes a plurality of equally spaced mounting holes, said holes having an elongated rectangular portion terminating at one end in a circular portion.

* * * * *